(12) United States Patent
Grimberg

(10) Patent No.: US 7,928,395 B2
(45) Date of Patent: Apr. 19, 2011

(54) INFRA-RED (IR) SENSOR WITH CONTROLLABLE SENSITIVITY

(75) Inventor: Ernest Grimberg, Kiryat Byalik (IL)

(73) Assignee: Opgal Ltd., Carmiel (IL)

( * ) Notice: Subject to any disclaimer, the term of this patent is extended or adjusted under 35 U.S.C. 154(b) by 811 days.

(21) Appl. No.: 10/574,462

(22) PCT Filed: Aug. 11, 2004

(86) PCT No.: PCT/IL2004/000740
§ 371 (c)(1),
(2), (4) Date: Mar. 31, 2006

(87) PCT Pub. No.: WO2005/032126
PCT Pub. Date: Apr. 7, 2005

(65) Prior Publication Data
US 2007/0018105 A1    Jan. 25, 2007

(30) Foreign Application Priority Data

Oct. 2, 2003 (IL) .......................................... 158245

(51) Int. Cl.
*G01J 5/00* (2006.01)
(52) U.S. Cl. ...................................................... 250/349
(58) Field of Classification Search .................. 250/349
See application file for complete search history.

(56) References Cited

U.S. PATENT DOCUMENTS

| | | | | |
|---|---|---|---|---|
| 4,782,396 A | * | 11/1988 | Park | 348/353 |
| 2004/0106211 A1 | * | 6/2004 | Kauer et al. | 436/169 |
| 2006/0022139 A1 | * | 2/2006 | Garber et al. | 250/330 |
| 2006/0192081 A1 | * | 8/2006 | Cartlidge et al. | 250/208.1 |

FOREIGN PATENT DOCUMENTS

| | | |
|---|---|---|
| EP | 0776124 | 5/1997 |
| JP | 07-244145 | 9/1995 |
| JP | 2000-046958 | 2/2000 |
| WO | WO 01/38825 | 5/2001 |
| WO | WO 03/067874 | 8/2003 |

OTHER PUBLICATIONS

Hsieh et al, A new CMOS Readout Circuit Design for the IR FPA with Adaptive Gain Control and Current Mode Background Suppression, 1996, IEEE, 137-140.*
Computer translation for JP7-244145.*
International Preliminary Report on Patentability Dated Jan. 20, 2006 From the International Preliminary Examining Authority Re.: Application No. PCT/IL2004/000740.

(Continued)

*Primary Examiner* — David P Porta
*Assistant Examiner* — Djura Malevic

(57) ABSTRACT

An infrared sensor contains a sensor array and a sensitivity adjuster. The sensor array collects IR energy from an external scene, and the sensitivity adjuster adjusts a pixel grouping for light collection and/or readout, so that the resulting IR image is available at a required sensitivity level.

26 Claims, 9 Drawing Sheets

OTHER PUBLICATIONS

Official Action Dated Dec. 30, 2009 From the US Patent and Trademark Office Re.: U.S. Appl. No. 10/574,462.
Response Dated Jan. 12, 2010 to Notice of Reason for Rejection of Nov. 13, 2009 From the Japanese Patent Office Re.: Application No. 2006-531008.
Translation of Notice of Reason for Rejection Dated Mar. 9, 2010 From the Japanese Patent Office Re.: Application No. 2006-531008.
Translation of Notice of Reason for Rejection Dated Nov. 13, 2009 From the Japanese Patent Office Re.: Application No. 2006-531008.
IPRP.
OA of Jul. 21, 2006.
OA of Mar. 25, 2008 Rule 71[3].
Office Action Jul. 2, 2008.
Search Report+Written Opinion.

* cited by examiner

INFRA-RED (IR) SENSOR WITH CONTROLLABLE SENSITIVITY

RELATED APPLICATIONS

This application is a National Phase Application of PCT Patent Application No. PCT/IL2004/000740 having International Filing Date of 11 Aug. 2004, which claims the benefit of Israel Patent Application No. 158245, filed on 2 Oct. 2003. The contents of the above Applications are all incorporated herein by reference.

FIELD AND BACKGROUND OF THE INVENTION

The present embodiments relate to an IR sensor and, more particularly, to and IR sensor with controllable sensitivity.

Infra-red (IR) sensors detect the IR radiation emitted from an object, and are used for day and night vision, non-contact temperature measurement in many industrial, security, and medical applications. These applications include aircraft imaging systems, human temperature sensors, surveillance systems, fire alarms, and night vision equipment.

IR sensors generally operate by detecting the differences in the thermal radiance of various objects in a scene. The difference is converted into an electrical signal, which is then processed and analyzed or displayed. Imaging cameras or radiometers, such as forward-looking IR (FLIR) instruments, utilize an array of IR sensors to provide a two-dimensional thermal image.

There are two distinctive sensor technologies: thermal detection and photon detection. Thermal detectors use secondary effects, such as the relation between conductivity, capacitance, expansion and detector temperature, to detect IR radiation. Thermal detectors include bolometers, thermocouples, thermopiles, and pyroelectric detectors. Photon detectors translate the photons directly into photoelectrons. The charge accumulated, the current flow, or the change in conductivity is proportional to the radiance of objects in the scenery viewed. Photon detectors generally have higher performance than comparable thermal detectors, with larger detectivities and smaller response times, but generally need to be cooled to cryogenic temperatures.

Systems based on cryogenically-cooled detectors have several advantages. The detector elements are usually smaller in size than comparable microbolometer detector elements. Shorter focal length lenses can be used to attain the same required spatial resolution. FLIR cameras based on cooled detectors generally have very good sensitivity, and reasonable physical dimensions even for long focal length optics, since high f-number devices may be used.

Four distinct generations of FLIR cameras have been designed, based on IR detector technologies developed during the last 30 years. The various generations are classified according to the number of elements contained in each group. First generation FLIR cameras used a small number of detectors and a mechanical scanner to generate a two-dimensional image. Today's fourth generation FLIR cameras contain two-dimensional focal plane array (FPA) of IR sensors that do not require any scanning mechanism.

After the sensor array is exposed to external radiation for a duration known as the exposure time, a readout circuit scans the sensor array and reads out the signal of the individual sensors composing the sensor array in a sequential manner. Readout circuits are classified into two modes, integrate then read (ITR) (also denoted snapshot readout) and integrate while read (IWR). The ITR approach performs detector exposure and sensor readout sequentially. The sensor array is exposed, read, exposed again, and so on. The IWR approach performs sensor exposure and readout in parallel, by storing the sensor signals from the previous exposure cycle in an analog or digital buffer. FPA detectors are commonly provided with an on-chip readout integrated circuit (ROIC).

In general, the readout time varies directly with the size of the sensor array. For example the typical readout time for a detector of 640 by 480 elements is about 10 milliseconds ($10^{-2}$ second) while the readout time for a detector of 320 by 240 detector elements is only 2.5 milliseconds.

Reference is now made to FIG. 1, which is a simplified block diagram of a prior art FLIR camera. FLIR camera 100 contains an optical portion 110 which focuses IR radiation from an external scene onto sensor array 120 within IR detector 115. Optical portion 110 generally consists of one or more lenses, which may be adjustable to control focus positioning or to perform optical zoom. Sensor array 120 is a photon detector, therefore IR detector 115 is cooled to the cryogenic temperatures required for photon detection. Sensor array 120 is followed by readout circuit 130, which reads out the sensor array signals. A third detector component is the detector operation mode controller 135, which is a register containing the detector settings, such as sensor readout window size and location, operating mode (ITR/IWR), detector exposure time and additional variables such as bias current. The readout signal is processed by various processing elements, which in FIG. 1 are grouped together as processor 140. The processing elements generally perform tasks such as non-uniformity correction (NUC) and bad pixel replacement (BPR), as well as video processing to obtain a video signal from the sensor array signal output.

The current from an infrared detector may be subdivided into two parts: photocurrent and dark current. The photocurrent is the useful response of the detector, which results from absorption of infrared photons in the detector. These photons create charge carriers which can be collected as a photocurrent. Dark current is an undesired part of the detector current, which is present even if the detector is not illuminated. The origin of dark current is usually thermal excitation of charge carriers, a process that competes with photo excitation.

FLIR cameras with photon detector sensor arrays provide IR images with limited sensitivity. Photon detector SNR is limited by several factors. The detector can only absorb a limited number of photons. If the exposure time is too long many of the sensor array detectors saturate and a blank image is obtained. The sensor array must be discharged during readout often enough to prevent saturation. However, if the sensor array is discharged too frequently (due to a very short detector exposure time), the SNR for a single readout is limited by the noise which is present even in the absence of IR radiation. If the exposure time is too short, insufficient photons are collected and a dark image is obtained. Current FLIR cameras generally perform a single exposure/readout cycle per video frame. The image sensitivity is therefore limited by the ratio of the detector signal and the total noise associated with the process. The noise contains fluctuations associated with the signal itself (quantum noise), readout noise, fluctuations of the dark current, and so forth.

In an FPA-based FLIR camera, assuming an ideal optics, the spatial resolution of the image is determined by the number of pixels on the detector array. Common formats for commercial infrared detectors are 320×240 pixels (320 columns, 240 rows), and 640×480, with typical pitches between pixels in the range 20-50 um. FLIR cameras that have both a large field of view (FOV) and a high spatial resolution are usually based on large detector formats like 640×480, 1000×

1000, or even larger, with a pitch size as small as 15 um and below. The read out time for such large detector formats is relatively long. In order to obtain a required frame rate for the video signal, the detector exposure time must often be limited, even for low f-number systems. The limited detection time results in insufficient light collection, which decreases the signal to noise ratio. Thus, high-resolution FLIR cameras with long readout times often have poor sensitivity.

There is thus a widely recognized need for, and it would be highly advantageous to have, an IR sensor and IR camera devoid of the above limitations.

SUMMARY OF THE INVENTION

According to a first aspect of the present invention there is provided an infrared sensor which contains a sensor array, consisting of multiple IR sensors, and a sensitivity adjuster. The sensor array collects IR energy from an external scene, and the sensitivity adjuster adjusts a pixel grouping for light collection and/or readout, so that the resulting IR image is available at a required sensitivity level.

Preferably, the sensor array is a two dimensional arrangement of the IR sensors. Preferably, the sensor array is an array of photon detectors. In one preferred embodiment, the photon detectors are photoconductive sensors. In an alternate preferred embodiment, the photon detectors are photovoltaic sensors.

Preferably, the sensor array is an infrared focal plane assembly (IRFPA).

Preferably the IR sensor further contains a readout element associated with the sensor array, for performing periodic sensor array readout.

Preferably, the sensitivity adjuster contains a window selector for selecting a readout window within the array.

Preferably, the sensitivity adjuster contains a grouping factor selector for selecting a pixel grouping factor during IR energy collection.

Preferably, the readout element has a readout time variable with a size of a selected readout window.

Preferably, the readout element is an integrate while read (IWR) device.

Preferably, the readout element is an integrate then read (ITR) device.

Preferably, the adjusting is in accordance with externally provided control information.

Preferably the IR sensor further contains an image processor for processing a sensor array output signal and/or readout signal so as to form a feedback signal for controlling the adjusting.

Preferably, the image processor further contains an SNR detector for detecting an SNR of the image signal. The detected SNR preferably consists of one or a combination of the average SNR, the maximum SNR, and the minimum SNR.

Preferably, the image processor further contains a contrast detector, for detecting a contrast level of the image signal. The detected contrast level preferably consists of one or a combination of the average contrast level, the maximum contrast level, and the minimum contrast level.

Preferably, the IR sensor further contains an exposure time calculator for selecting a sensor exposure time.

Preferably, the selecting is in accordance with external scene total radiation.

Preferably, the exposure time calculator is operable to maintain an average collected charge of the sensor at a specified level.

Preferably, the selecting is in accordance with previously obtained sensor exposure levels.

Preferably, the IR sensor further contains an averager for averaging respective IR sensor levels over multiple readout cycles. Preferably, the number of cycles averaged is the maximum number of completed sensor exposure and readout cycles included in a single video frame time.

Preferably, the IR sensor further contains an optical portion for focusing external IR radiation upon the sensor array Preferably, the IR sensor further contains a mode selector for switching between a high-sensitivity operating mode and a low-sensitivity operating mode. Preferably, the switching is in accordance with the feedback signal. Preferably, the mode selector switches between a small readout region and a large readout region and/or between a large pixel grouping and a small pixel grouping, respectively to provide high-sensitivity and low-sensitivity imaging.

According to a second aspect of the present invention there is provided an IR camera containing a sensor array, a sensitivity adjuster and a video processor. The sensor array collects IR energy from an external scene, and the sensitivity adjuster adjusts a pixel grouping for light collection and/or readout, so that the resulting IR image is available at a required sensitivity level. The video processor processes the sensor array output to form a video image.

Preferably, IR camera further contains an optical portion for focusing external IR radiation upon the sensor array Preferably, IR camera further contains a readout element associated with the sensor array, for performing periodic sensor array readout.

Preferably, the sensitivity adjuster contains a window selector for selecting a readout window within the array.

Preferably, the sensitivity adjuster contains a grouping factor selector for selecting a pixel grouping factor during IR energy collection.

Preferably, IR camera further contains an image processor for processing the image signal so as to form a feedback signal for controlling the adjusting.

Preferably, the feedback signal is at least one of: average image SNR, maximum image SNR, minimum image SNR, average image contrast, maximum image contrast, and minimum image contrast.

Preferably, IR camera further contains a mode selector for switching between a high-sensitivity operating mode and a low-sensitivity operating mode.

Preferably, the IR camera is a FLIR device.

Preferably, IR camera further contains an image analyzer, for analyzing the video image to identify specified properties of interest.

Preferably, the IR camera is a surveillance device.

Preferably, the IR camera is a targeting device.

Preferably, IR camera further contains a head up display (HUD). In a further preferred embodiment, the IR camera is an aircraft visibility enhancer.

According to a third aspect of the present invention there is provided a method for IR sensing by adjusting a pixel grouping of a sensor array to provide a required image sensitivity, and collecting IR energy from the external scene with the sensor array at the adjusted pixel grouping.

Preferably, the method contains the further step of selecting a sensor exposure time.

Preferably, the selecting is to maintain an average collected charge of the sensor at a specified level.

Preferably, the method is performed repetitively at a maximum rate permitted by the pixel grouping and the selected exposure time.

Preferably, the selecting is in accordance with previously obtained sensor exposure levels.

Preferably, the method contains the further step of performing periodic sensor readout.

Preferably, the adjusting consists of selecting a readout window within the array.

Preferably, the adjusting consists of a selecting a grouping factor.

Preferably, the method contains the further step of forming a feedback signal for controlling the adjusting from the sensor readout.

Preferably, the feedback signal is at least one of: average image SNR, maximum image SNR, minimum image SNR, average image contrast, maximum image contrast, and minimum image contrast.

Preferably, the method contains the further step of averaging respective sensor levels over multiple readout cycles.

Preferably, the method contains the further step of switching between a high-sensitivity operating mode and a low-sensitivity operating mode.

Preferably, the method contains the further step of analyzing the video IR image to identify specified properties of interest.

The present invention successfully addresses the shortcomings of the presently known configurations by providing an IR sensor having pixel grouping control to provide an IR image with controllable sensitivity.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer with any suitable instruction set, or by a reduced instruction set (RISC) machine. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
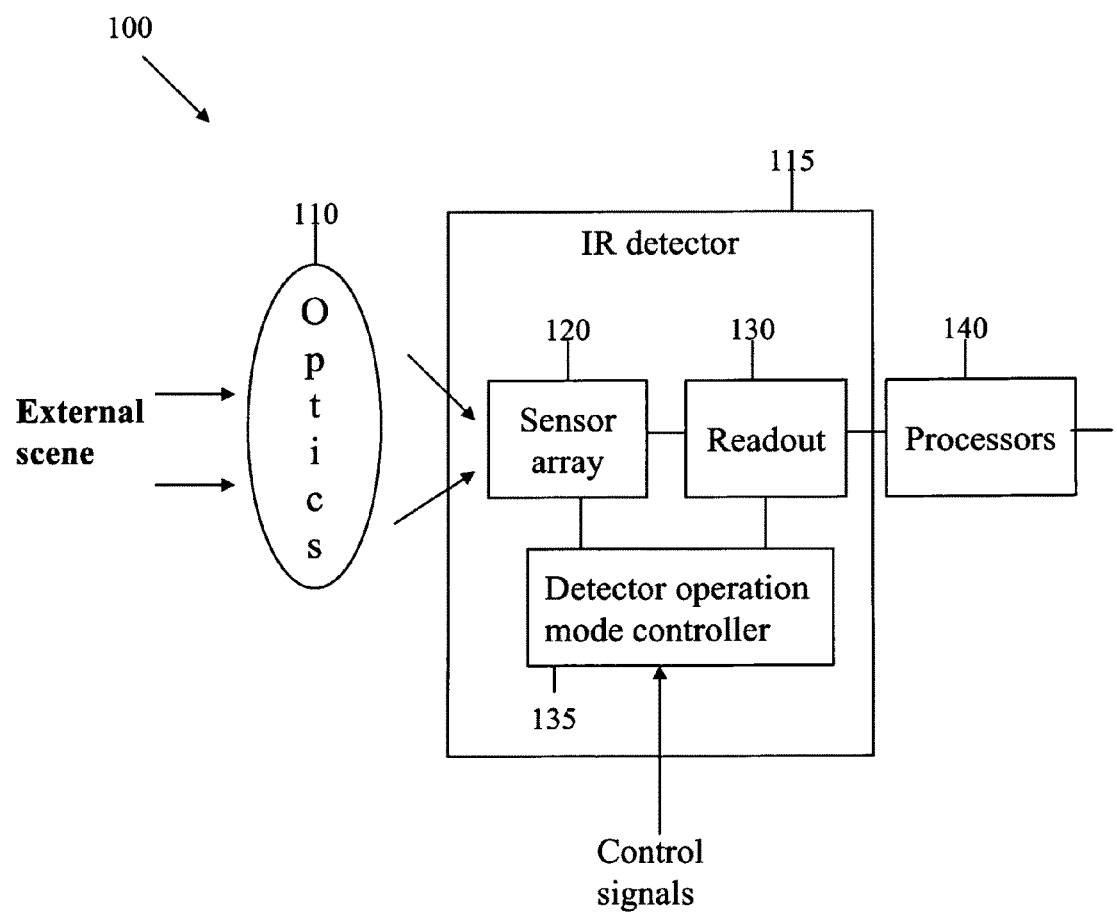
FIG. 1 is a simplified block diagram of a prior art FLIR camera.

The present embodiments are of an IR sensor that can detect external IR radiation with varying sensitivity. Specifically, the present embodiments tailor the sensor's light collection and readout properties to the desired sensitivity level, which may be based on factors such as application requirements, external conditions, and the quality of the IR image obtained from the sensor.

The principles and operation of an IR sensor according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 2:
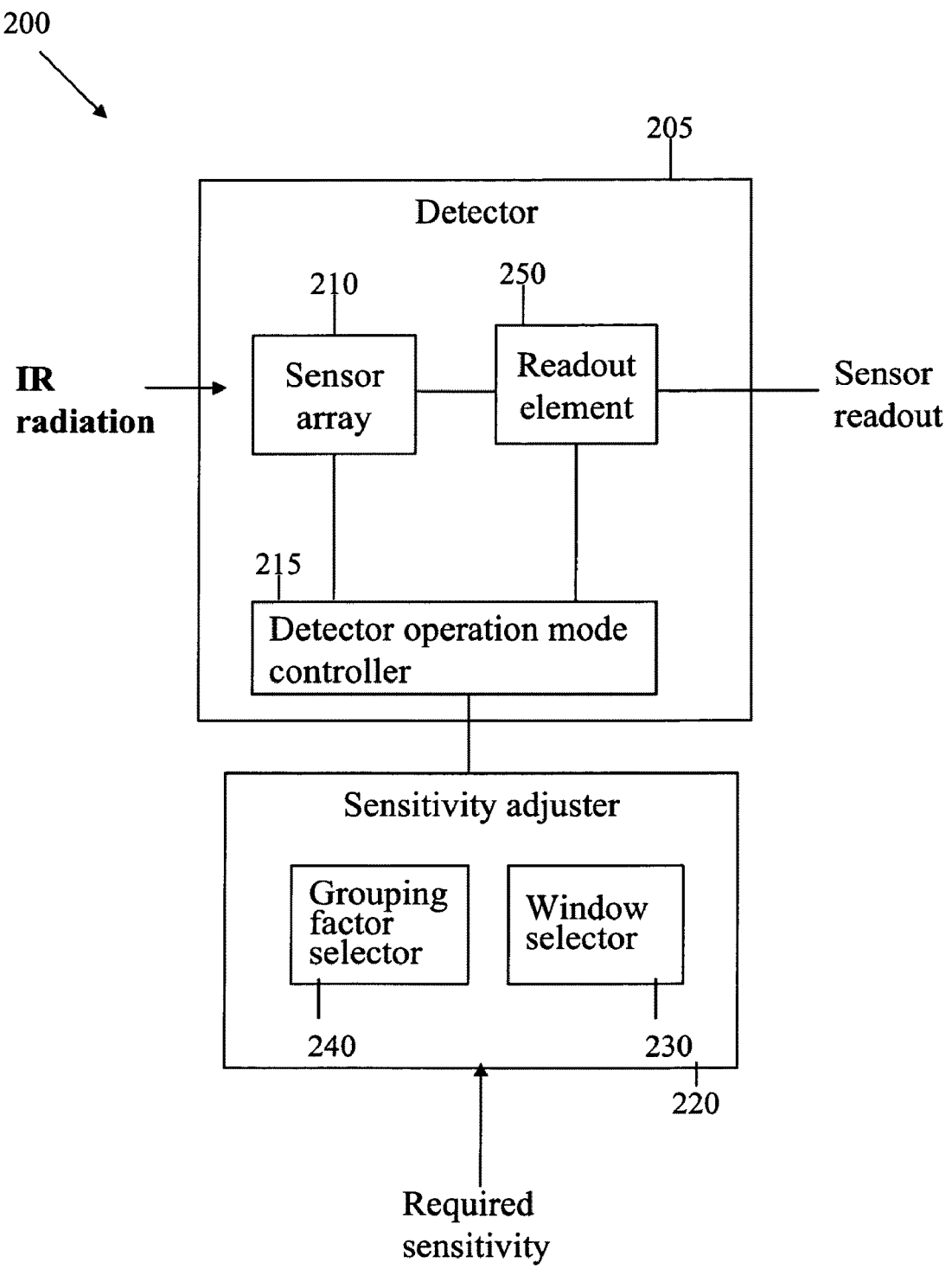
FIG. 2 is a simplified block diagram of an IR sensor, according to a preferred embodiment of the present invention.

Reference is now made to FIG. 2, which is a simplified block diagram of an IR sensor, according to a preferred embodiment of the present invention. IR sensor 200 contains sensor array 210, which collects IR energy from the sensitivity adjuster 220, which adjusts a sensor pixel grouping in order to provide the required image sensitivity. Preferably IR sensor 200 further contains detector operation mode controller 215, and/or readout element 250 which performs sensor readout. Detector operation mode controller 215 holds the detector control settings, including those established by sensitivity adjuster 220. In the preferred embodiment, sensor array 210, detector operation mode controller 215, and readout element 250 are integrated to form an IR detector, which is controlled by sensitivity adjuster 220.

The preferred embodiments presented below utilize two types of pixel groupings. The first pixel grouping selects a sensor readout window, which determines the sensor array readout time. Limiting the readout window decreases the readout time and consequently increases the sequence rate, that is the number of IR images which can be obtained from IR sensor 200 in a given time period. Multiple images may then be combined to form a higher sensitivity image, as described below. The second pixel grouping divides the IR sensors in sensor array 210 into groups containing a fixed number (denoted herein a grouping factor) of IR sensors. The grouped sensors collect IR radiation jointly during the exposure time. Detecting IR radiation with grouped sensors enables collecting a greater amount of IR radiation during a given exposure cycle, as more photons may be collected without saturating the detector. As a result the signal to noise ratio (SNR) is improved, and a greater sensitivity signal is obtained. The two types of groupings, window selection and sensor grouping, may be used independently or together. When used in combination, sensitivity adjuster 220 selects both a readout window and a grouping factor, to obtain a desired sensitivity level. IR sensors with controllable readout window and sensor grouping are currently available. Preferably, sensitivity adjuster 220 stores the selected settings in detector operation mode controller 215.

Cooled IR detectors are currently available which provide windowing and/or pixel grouping capabilities. As discussed above, IR detectors are available which allow the user to select a window from defined set of readout window dimensions. Likewise, IR detectors with pixel grouping generally allow the user to select between several defined pixel groupings, generally single pixel or four grouped pixels (two on each axis). The four grouped detector elements function like a super-pixel that collects a quadruple amount of charge, with a resultant reduced spatial resolution by the same factor of four. For example, in super-pixel mode a detector that contains 640 by 480 elements behaves like a detector with 320 by 240 detector's elements but each element collects four times more charge and the readout time is reduced by the same factor.

In the preferred embodiment, sensitivity adjuster 220 contains window selector 230, which selects a readout window, and/or grouping factor selector 240, which selects a grouping factor. The operation of both these elements is described more fully below.

Preferably, sensor array 210 is a two dimensional array of IR detectors, such as an infrared focal plane assembly (IR-FPA). Preferably the IR sensors forming sensor array 210 are photon detectors, either photoconductive or photovoltaic sensors. As discussed above, photon detectors generally require cryogenic cooling for proper operation.

The following embodiments are directed at an IR sensor within an IR video camera, such as a FLIR camera. The IR images collected by the IR sensor are used to build a sequence of video signal frame at a predefined frame rate. However, the embodiments apply to a standalone IR sensor and to an IR sensor incorporated within other types of devices, without loss of generality.

In the preferred embodiment, sensitivity adjuster 220 contains window selector 230. Window selector 230 selects a sensor readout window, which may encompass the entire array or a defined sub-window within the array. The readout window consists of a defined m by n pixel portion, preferably located anywhere on sensor array 210. The sensor readout time is a unique function of the number of detectors read out (for ITR mode), or the largest value of the current exposure period and the readout time (for IWR detectors), so that the sensor array may undergo more exposure cycles during a given time period. For example, the readout time a 320×240 sub-window out of a sensor array of 640×480 is approximately a quarter of the original time required to readout the entire detector.

The obtainable sequence rate depends on the exposure time, readout time, and the readout technique. For a readout window of m by n pixels, the sequence rate for ITR mode is:

$$\text{Sequence\_Rate}=1/\text{Exposure\_time}(\text{scenery\_radiation})+\text{Readout\_time}(m,n) \qquad (1)$$

while for IWR mode the sequence rate is:

$$\text{Sequence\_Rate}=1/\text{Max}(\text{Exposure\_time}(\text{scenery\_radiation}),\text{Readout\_time}(m,n)) \qquad (2)$$

Reducing the readout time thus increases the sequence rate for ITR readout, and may increase the sequence rate for IWR readout (if the readout time exceeds the detector exposure time).

Preferably sensor exposure and readout are repeated at the maximum sequence rate possible for the selected pixel grouping. The sensor levels from multiple exposure cycles may later be combined to obtain a higher sensitivity image than that obtained from a single exposure cycle, as described below.

In the preferred embodiment, IR sensor 200 contains readout element 250, which performs sensor readout for each exposure period. The readout time generally varies with the size of the selected readout window. Readout element 250 may use the ITR or the IWR techniques, where using the IWR technique requires the addition of appropriate buffer circuitry.

In the preferred embodiment, sensitivity adjuster 220 contains grouping factor selector 240 which selects a grouping factor. The grouping factor is the number of detectors which are combined during photon detection in order to collect a larger amount of IR energy. When sensors are grouped, the IR image SNR is improved by a factor equal to the magnitude of the square root of the grouping factor. For example, if the grouping factor equals four, groups of four adjacent pixels are formed over the readout window. The SNR is improved by a factor of essentially two, however the IR image consists of one quarter as many pixels as with ungrouped sensors. Utilizing a pixel grouping factor thus trades of sensitivity with image resolution. Note that when both types of pixel groupings are combined, a readout window, consisting of all or a specified portion of sensor array 210, is selected along with the grouping factor.

Figure 3:
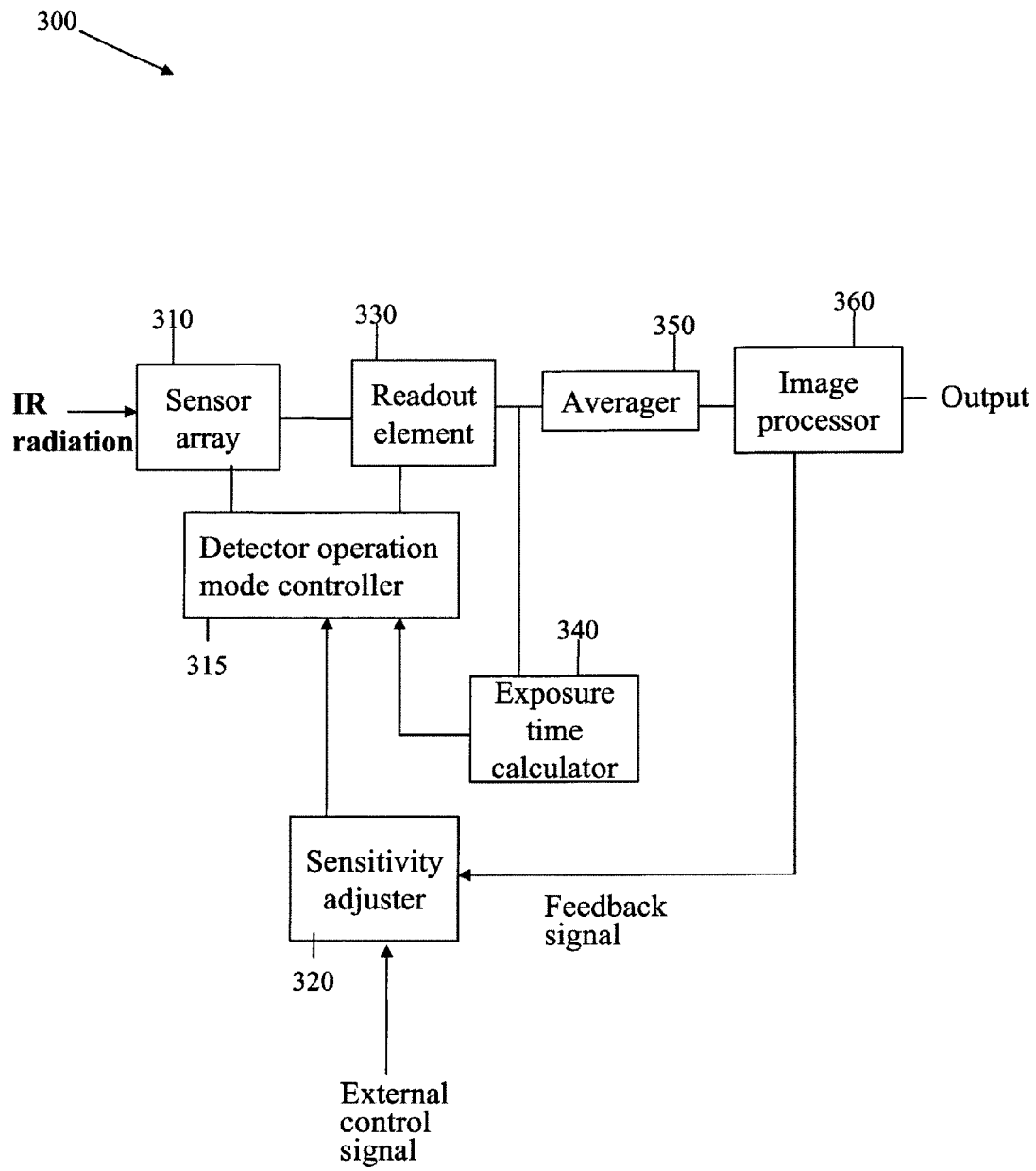
FIG. 3 is a simplified block diagram of an IR camera, according to a further preferred embodiment of the present invention.

Reference is now made to FIG. 3, which is a simplified block diagram of an IR camera, according to a further preferred embodiment of the present invention. IR camera 300 contains sensor array 310, sensitivity adjuster 320, and one or more of: detector operation mode controller 315, readout element 330, exposure time calculator 340, averager 350, and image processor 360. Sensor array 310, detector operation mode controller 315, sensitivity adjuster 320, and readout element 330 operate essentially as described above.

In the preferred embodiment, IR camera 300 contains exposure time calculator 340, which selects the sensor array exposure time. As shown above, the detector exposure time affects the frame rate which may be obtained from the IR detector. In the preferred embodiment, the detector exposure time is controlled and updated by a closed loop that maintains the average collected charge constant at a desired percentage of the well capacity. The selected exposure time therefore depends upon the total IR radiation levels being detected by sensor array 310. The exposure time for the current exposure is preferably determined from the sensor output levels obtained during previous exposure cycles. Preferably, exposure time calculator 340 stores the selected exposure time in detector operation mode controller 315.

As seen from equations 1 and 2 above, reducing the exposure time increases the sequence rate for ITR readout, and may increase the sequence rate for IWR readout (when the detector exposure time exceeds the readout time). However, under a constant IR radiation level a reduced exposure time also results in a decreased SNR.

Exposure time calculator 340 ensures that the maximum number of exposure cycles per unit of time may be performed, while maintaining the quality of the image sequence obtainable from IR camera 300. Enough photons are detected to differentiate between bright and dark portions of the image, while the charge collected does not saturate the detectors. This is in contrast with many current FLIR cameras, which perform a single exposure cycle per frame for a fixed exposure time.

In the preferred embodiment, IR camera 300 contains averager 350, which generates an IR image by averaging respective IR sensor signals over multiple exposure/readout cycles. In a video FLIR camera, averager 350 generates each video frame by averaging together all the fully completed exposure cycles which occurred during the previous frame period. For example, if the output video format is 30 frames per second, the video frame is built by averaging the fully-performed exposure/readout cycles during the previous $\frac{1}{30}$-th of a second. Generally, the number of cycles which are averaged is not constant, but depends on the incoming IR radiation.

Averaging the sensor values from multiple exposure cycles effectively increases the IR energy which is collected by the sensor array detectors. The SNR of the resulting IR image is proportional to the square root of the number of exposure cycles averaged. When window selector 230 selects a smaller readout window, the number of exposure/readout cycles which are performed in a given time period is increased, thereby increasing a higher sensitivity image. In the example discussed above, reducing the detector readout window from 640×480 to 320×240 resulted in a quadrupling of the number of exposure/readout cycles which may be performed per frame.

In a FLIR camera, selecting a sub-window within sensor array 310 limits the FOV of the FLIR camera to the selected portion of the image focused on sensor array 310. However, as described below, a higher sensitivity image may be obtained, which in many applications is of greater importance than maintaining a large FOV. For example, in a vision enhancement application for aircraft the FLIR camera may use the entire field of view (FOV) during good atmospheric conditions and a limited FOV during poor atmospheric conditions to improve image clarity and detail.

In the preferred embodiment, sensitivity adjuster 320 determines the required sensitivity level from externally provided control information, such as a user selection. The control information may also be provided by other system components, such as altitude and weather sensors in an aircraft.

In the preferred embodiment, IR camera 300 contains image processor 360, which processes the sensor array output signal, and forms a feedback signal which is used by sensitivity adjuster 320 to adjust the pixel groupings (i.e. readout window dimensions and location and/or sensor grouping factor). Image processor 360 may follow averager 350 as shown in FIG. 3 or may connect directly to readout element 330. Image processor 360 processes the IR image or image sequence, and analyzes image characteristics such as SNR and contrast. The feedback signal from image processor 360 is used by sensitivity adjuster 320 to adjust pixel grouping parameters in order to obtain the desired image quality. For example, sensitivity adjuster 320 may reduce the readout window if the current SNR is below a specified threshold.

In the preferred embodiment, image processor 360 contains an SNR detector which determines the image signal SNR. The SNR detector may detect any single or weighted combination of the following factors: image maximum SNR, minimum SNR, and average SNR.

In the preferred embodiment, image processor 360 contains a contrast detector for detecting the image signal contrast. The contrast detector may detect any single or weighted combination of the following factors: image maximum contrast, minimum contrast, and average contrast.

In the preferred embodiment, sensitivity adjuster 320 contains a mode selector which switches IR camera 300 between two or more predefined sensitivity modes, where a mode consists of a prespecified readout window and/or grouping factor, in order to provide higher and lower sensitivity operation as required.

Preferably, IR camera 300 contains an optical portion, such as a lens, for focusing external IR radiation upon the sensor array.

Figure 4:
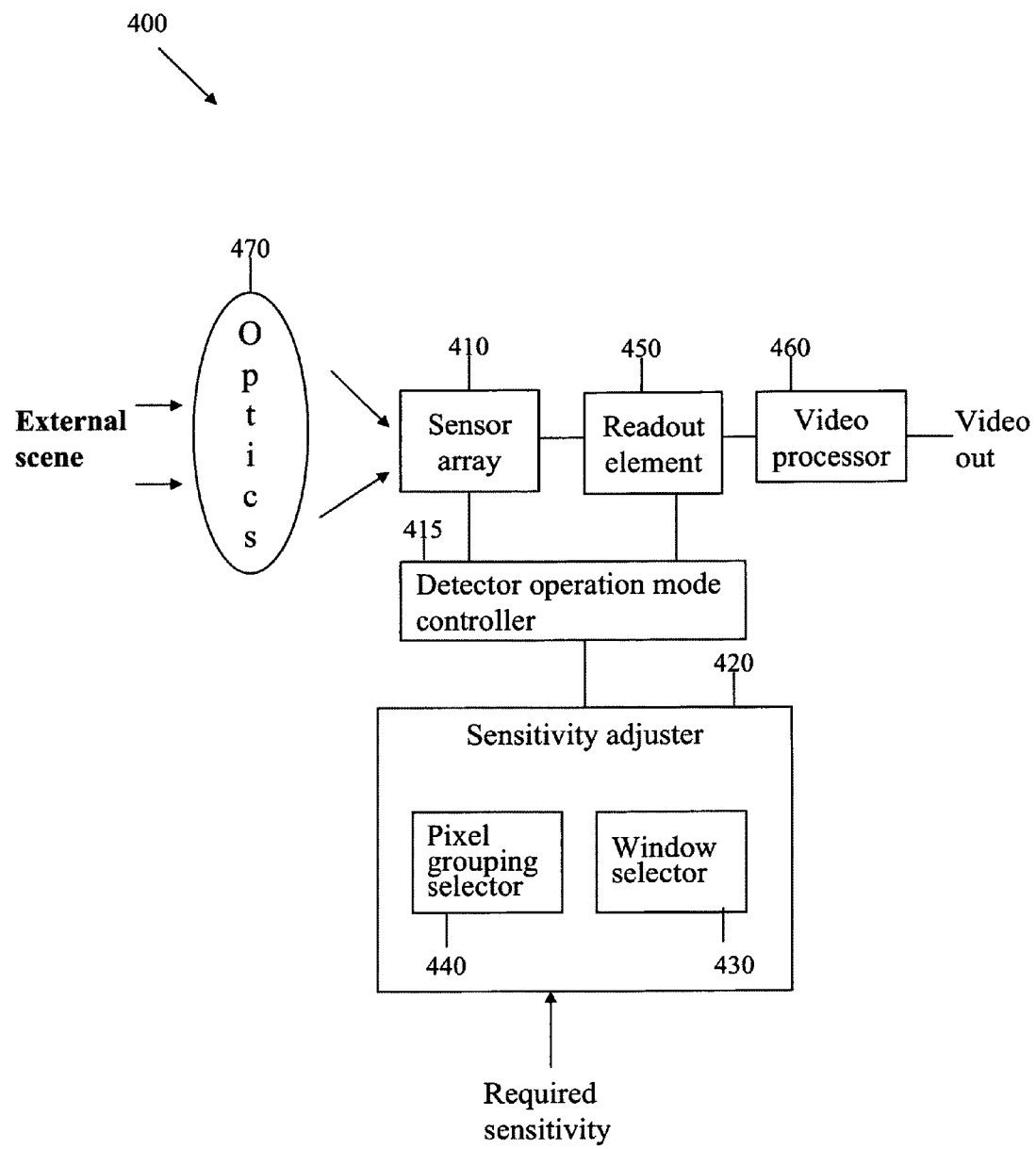
FIG. 4 is a simplified block diagram of an IR camera, according to a preferred embodiment of the present invention.

Reference is now made to FIG. 4, which is a simplified block diagram of an IR camera, according to a preferred embodiment of the present invention. IR camera 400 contains sensor array 410, detector operation mode controller 415, sensitivity adjuster 420, and readout element 450, which operate essentially as described above, and video processor 460, which processes the sensor array output to form a video image. Preferably IR camera 400 is a FLIR camera.

Video processor 460 obtains a sequence of detector output levels, and processes the detector levels into a two-dimensional image. Video processor 460 may perform NUC, BPR, and other tasks needed to convert the sensor levels into an accurate IR image. Video processor 460 preferably obtains the detector levels from readout element 450.

Preferably, IR camera 400 contains an optical portion, such as a lens, for focusing external IR radiation upon the sensor array.

Sensitivity adjuster 420 preferably contains window selector 430 and/or grouping factor selector 440, as discussed above.

In the preferred embodiment, IR camera 400 contains an image analyzer, which analyzes the video image provided by video processor 460, in order to identify specified properties of interest. In a first preferred embodiment, IR camera 400 is a surveillance device, in which case video processor 460 may be designed as a motion detector. In another preferred embodiment, IR camera 400 is a targeting device, and video processor 460 may identify potential targets based on their IR characteristics.

Preferably, IR camera 400 contains a head up display (HUD). In the preferred embodiment, IR camera 400 serves as an aircraft visibility enhancer, to enhance the IR image provided to pilots under difficult weather conditions.

Figure 5:
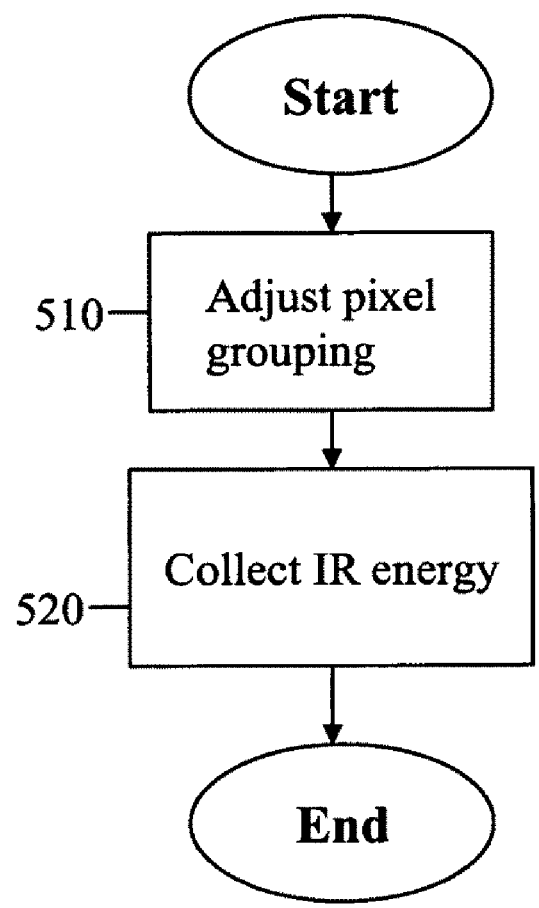
FIG. 5 is a simplified block diagram of a method for performing IR image sensing, according to a first preferred embodiment of the present invention.

Reference is now made to FIG. 5, which is a simplified block diagram of a method for performing IR image sensing, according to a first preferred embodiment of the present invention. A single exposure cycle consists of step 510, in which the sensor array pixel grouping is adjusted to provide the required image sensitivity, followed by step 520, in which IR energy is collected from an external scene by a sensor array in accordance with the selected pixel grouping. In the preferred embodiment, adjusting the pixel grouping consists of selecting a readout window and/or a grouping factor. Sensor readout is preferably performed for each exposure cycle.

In the preferred embodiment, one or more sensor readout signals are processed, preferably by averaging several readouts together, in order to form an IR image.

In the preferred embodiment, the method includes the further step of selecting a sensor exposure time. The exposure time is preferably selected to maintain the IR sensor's average collected charge at a specified level, for example 70%. The selection may be based on previously obtained sensor exposure levels.

Preferably, the exposure cycle is performed repetitively at the maximum rate permitted by the current pixel grouping and/or selected exposure time.

In the preferred embodiment, the IR image is processed in order to form a feedback signal for adjusting the pixel grouping. The feedback signal may be a function of image characteristics including: average image SNR, maximum image SNR, minimum image SNR, average image contrast, maximum image contrast, and minimum image contrast.

Preferably, an IR video sequence is formed from a sequence of IR images. The video IR image may then be analyzed to identify specified properties of interest, such as motion.

Preferably, the current method contains the further step of switching between two or more operating modes, having respective pixel groupings to yield IR images with respective sensitivity levels.

Figure 6:
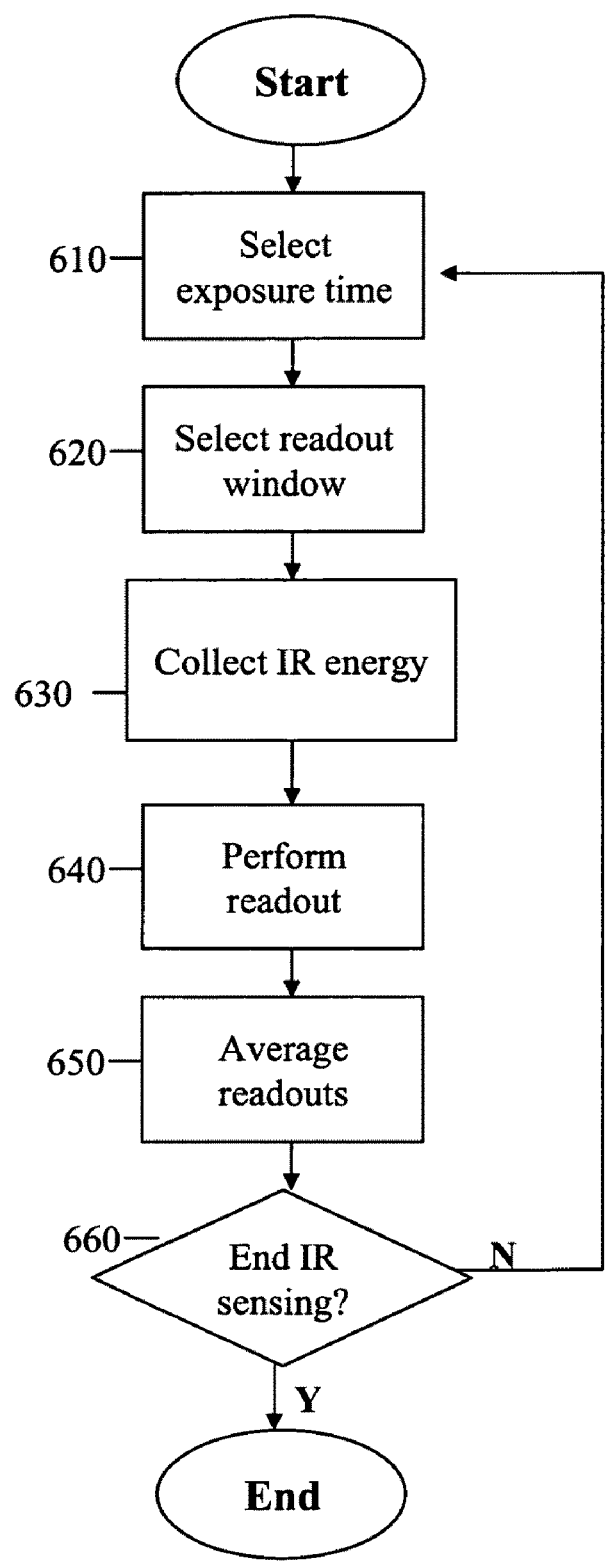
FIG. 6 is a simplified block diagram of a method for performing IR image sensing, according to a second preferred embodiment of the present invention.

Reference is now made to FIG. 6, which is a simplified block diagram of a method for performing IR image sensing, according to a second preferred embodiment of the present invention. The current method extends the method of FIG. 5 by combining several of the steps described above, in order to generate an IR video image for a FLIR camera. The FLIR camera is based on a two dimensional array of photon detectors, which convert photons into photoelectrons. Photon collection is performed with a closed-loop exposure time that maintains a constant average collection of photons independent of scenery radiation. After photon collection, the electronic readout circuit reads out the charge collected by the detector elements in the array, in a sequenced order and from a controlled readout window of m by n pixels located anywhere on the focal plane array. Detection may be performed in either ITR or IWR mode.

The exposure time and readout window are selected in steps 610 and 620 respectively. The decision to change the window size may be performed automatically or manually. The criteria for automatic operation may depend on IR image qualities such as SNR, contrast, or a weighting of these and other variables.

Photon detection is performed for the selected exposure time, in step 630. In step 640, the detector levels are read out at the maximum sequence rate permitted by the closed loop exposure time control and the window readout time (as determined by the selected readout window). Note that the sequence rate is independent of the video output format, since the video frames are generally formed from multiple sensor readouts. In step 650, an integer number of detector readouts are averaged to form a video frame, thus improving image sensitivity. Preferably the number of readouts averaged is the maximum number of full exposure/readout cycles included in one video frame time.

Figure 7A:
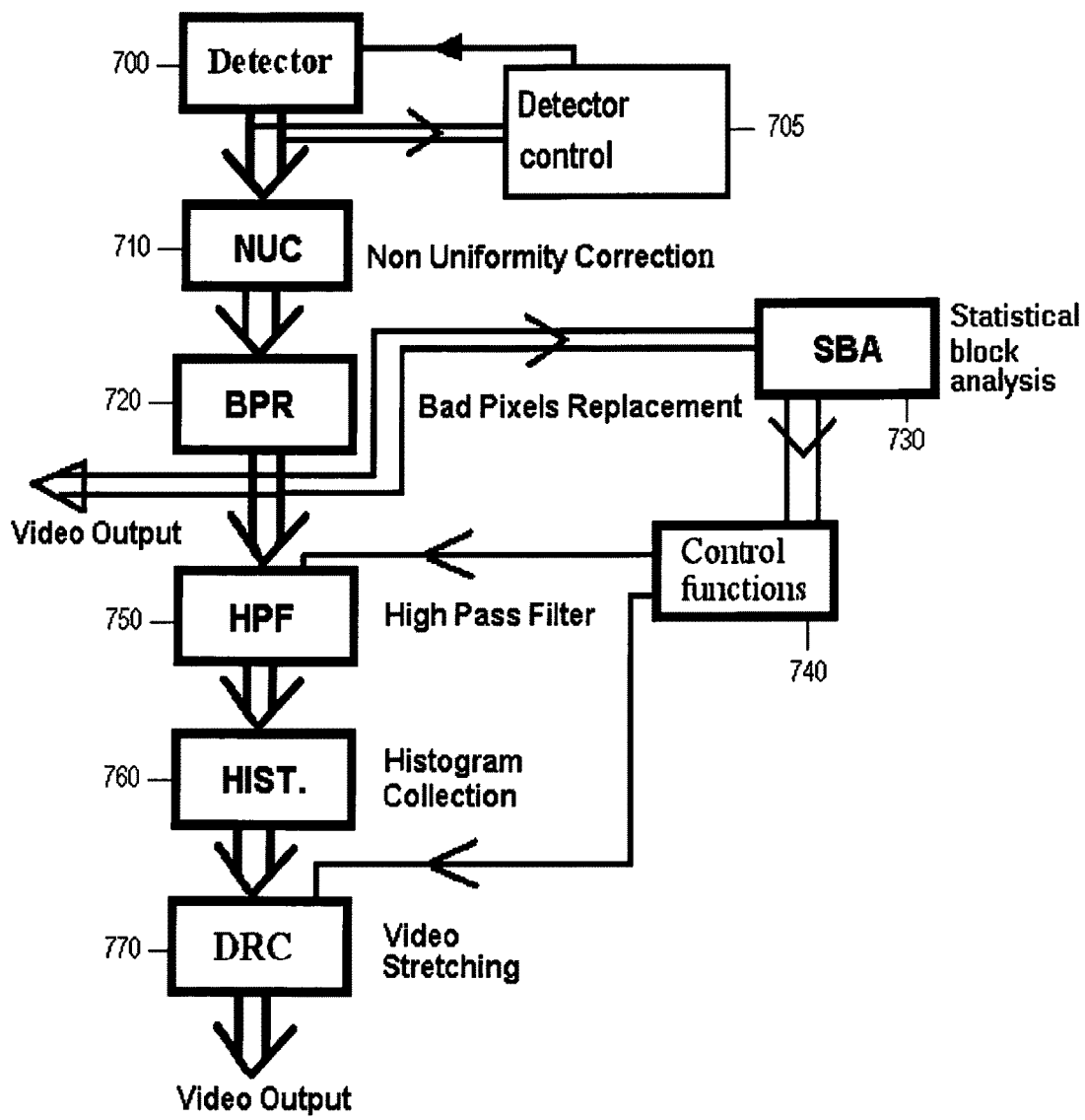
FIGS. 7a and 7b illustrate signal processing flow within an IR video camera without and with sensitivity adjustment respectively, according a preferred embodiment of the present invention.
Figure 7B:
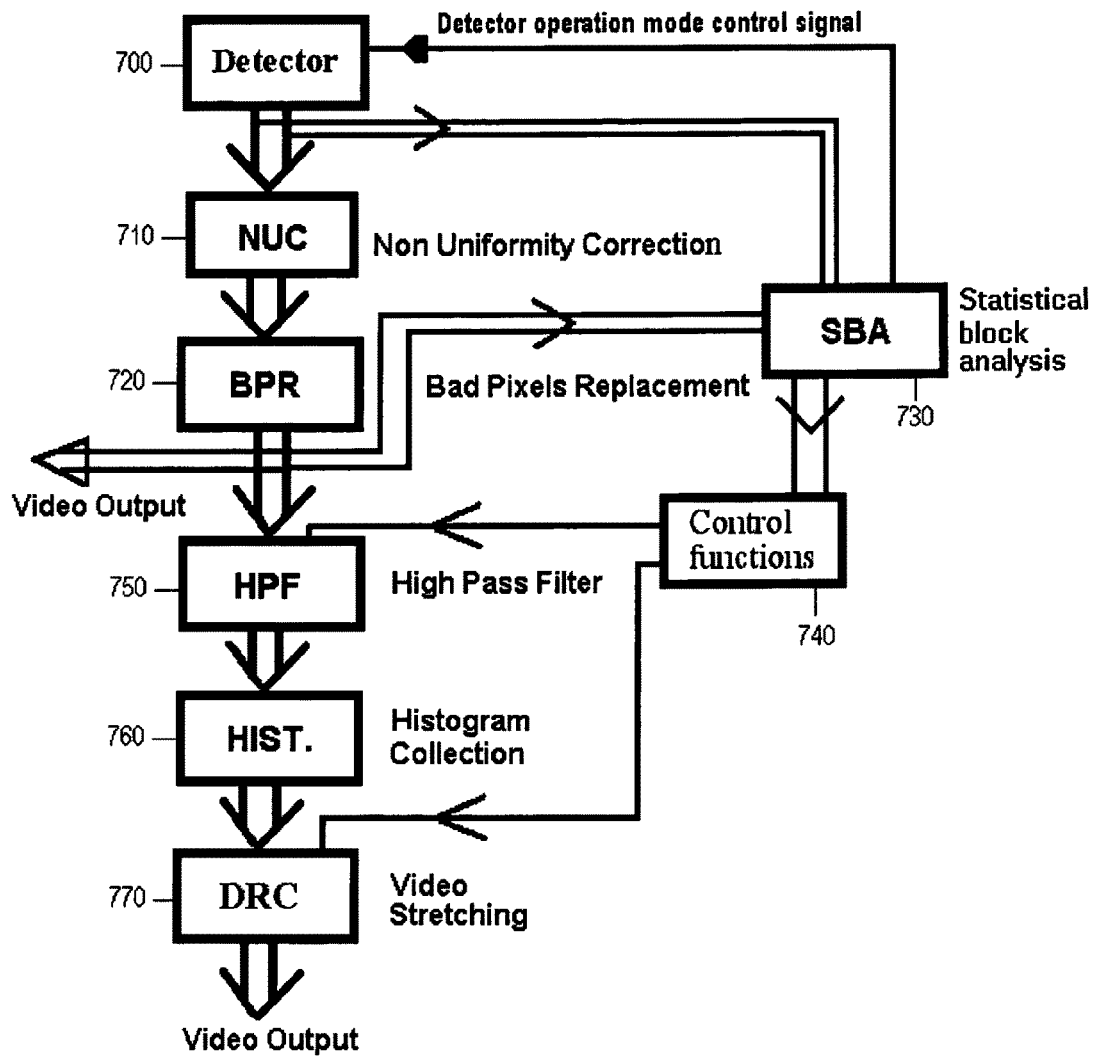

FIGS. 7a and 7b illustrate the way that sensitivity adjustment affects signal processing flow within an IR video camera, according to a preferred embodiment of the present invention. FIG. 7a shows an example of the signal processing steps performed within an IR camera without sensitivity adjustment. FIG. 7b is a non-limiting illustration of how sensitivity adjustment may be inserted into the processing flow.

Returning to FIG. 7a, in step 700 an IR readout signal is obtained from the IR detector at then end of each exposure period. Each readout signal is then processed in steps 705-770 as follows. In step 705, the unprocessed readout signal obtained in step 700 is analyzed, and the exposure time setting is selected and applied to the IR detector. In steps 710 and 720, NUC and BPR are performed as is common in the art. After BPR a crude video image is available, which is not comprehensible to the human eye but which may be used by tracking systems, motion detection systems and the like. The stream of crude video images is analyzed by statistical block analyzer (SBA) 730, whose results are used in step 740 to provide control information for later signal processing steps. The video signal is high-pass filtered in step 750, and the stream of filtered IR images is analyzed once again in step 760. Finally, in step 770 a non-linear transform is performed on the image signal based on the statistical information obtained during step 760. The transformation performs functions such as dynamic range compression and rescaling in order to transform the video signal into a signal comprehensible to the human eye.

FIG. 7b shows the processing flow with sensitivity adjustment. The processing flow is similar to FIG. 7a, with the difference that the detector feedback control previously performed in step 705 is now performed during SBA step 730, in order to determine sensitivity settings (i.e. pixel grouping) in addition to the exposure time settings. The sensitivity settings may therefore be based on statistical data gathered during step 730 as well as the raw detector readout signal. It is preferable to select the exposure time before selecting the sensitivity adjustment settings, since under conditions of adequate illumination the exposure time might be such that no sensitivity adjustment is necessary. The subsequent IR image is thus detected with the new control settings. Detector control may also rely on information provided during SBA (step 730).

Example

The following example presents the results obtained for IR imaging with readout window pixel grouping. IR imaging was performed with readout windows of 640×480 and 216× 112. A grouping factor of one was used for both cases. The image was collected by a 3 to 5 micron FLIR camera, with an f-number of 1.5.

Figure 8A:
FIGS. 8a and 8b show IR images obtained with readout windows of 640 by 480 detectors and 216 by 112 detectors respectively.
Figure 8B:
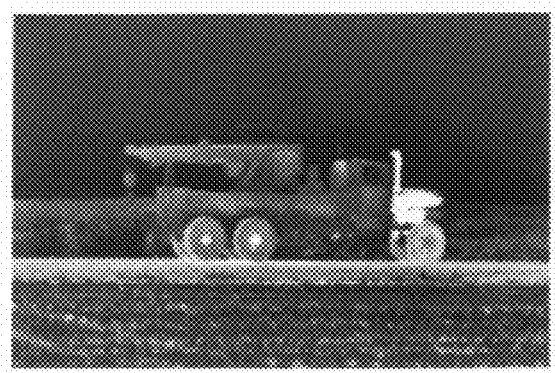

FIGS. 8a and 8b are IR images of a moving object FIG. 8a shows the lower-sensitivity image obtained with a readout window of 640 by 480 detector elements, while FIG. 8b shows the higher-sensitivity image obtained with a readout window of 216 by 112 detector elements. It is seen that FIG. 8b contains a limited portion of the image shown in FIG. 8a, but with greater clarity and detail.

TABLE 1

| SUBJECT | ENTIRE FIELD OF VIEW MODE | WINDOWING MODE |
|---|---|---|
| Picture size | 640 by 480 detector elements | 216 by 112 detector elements |
| Detector exposure time | 1.47 milliseconds | 1.47 milliseconds |
| Detector readout time | 10.25 milliseconds | 0.81 milliseconds |
| Maximum frame rate at ITR mode | 60 Frames/Sec | 420 Frames/Sec |
| Maximum frame rate at IWR mode | 90 Frames/Sec | 660 Frames/Sec |

TABLE 1-continued

| SUBJECT | ENTIRE FIELD OF VIEW MODE | WINDOWING MODE |
|---|---|---|
| SNR ratio for ITR mode | SNR | 2.6 * SNR |
| SNR for IWR mode | SNR | 3.3 * SNR |

Limiting the readout window decreases the detector readout time from 10.25 msec to 0.81 msec, consequently increasing the sequence rate for both ITR and IWR readout modes and improving the SNR by a factor of approximately 2.6.

IR imaging is an important tool used for many and varied applications, such as medical devices, industrial process control, aircraft navigation, and surveillance and targeting systems. The above embodiments describe a system and method for trading off IR image sensitivity with FOV and/or resolution. Systems can thus be tailored to provide IR images with varying characteristics under different operating conditions, a capability which is often of significance for obtaining optimum system performance.

It is expected that during the life of this patent many relevant IR sensors, IR detectors, photon detectors, readout circuits, readout modes, and FLIR cameras will be developed and the scope of the term IR sensor, IR detector, photon detector, readout circuits, readout mode, and FLIR camera is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An infrared sensor comprising:
 a sensor array comprising multiple IR sensors, configured for collecting IR energy from an external scene;
 an image processor, configured for processing a sensor array output signal to obtain an IR image, for analyzing said image to determine a property of said IR image, said property being indicative of image quality, and for generating a feedback signal in accordance with said property if said property crosses a threshold, said feedback signal being for adjusting between a field of view and a grouping of sensing pixels so as to derive a required image sensitivity; and
 a sensitivity adjuster associated with said sensor array, configured for deriving said required image sensitivity by adjusting between said field of view and said grouping of sensing pixels in accordance with said feedback signal.

2. An IR sensor in accordance with claim 1, wherein said sensor array comprises an array of photon detectors.

3. An IR sensor in accordance with claim 1, wherein said sensor array comprises an infrared focal plane assembly (IR-FPA).

4. An IR sensor in accordance with claim 1, wherein said sensitivity adjuster comprises a window selector configured for selecting a readout window within said array.

5. An IR sensor in accordance with claim 4, further comprising a mode selector configured for switching between a small readout region and a large readout region in accordance with said feedback signal, respectively to provide high-sensitivity and low-sensitivity imaging.

6. An IR sensor in accordance with claim 1, wherein said sensitivity adjuster comprises a grouping factor selector configured for selecting a pixel grouping factor during IR energy collection.

7. An IR sensor in accordance with claim 6, further comprising a mode selector configured for switching between a large pixel grouping and a small pixel grouping in accordance with said feedback signal, respectively to provide high-sensitivity and low-sensitivity imaging.

8. An IR sensor in accordance with claim 1, further comprising a readout element configured for performing periodic sensor array readout with a readout time variable with a size of a selected readout window.

9. An IR sensor in accordance with claim 1, wherein said adjusting is in accordance with externally provided control information.

10. An IR sensor in accordance with claim 1, wherein said property indicative of image quality comprises image SNR, and wherein said image processor further comprises an SNR detector configured for detecting an SNR of said IR image.

11. An IR sensor in accordance with claim 1, wherein said property indicative of image quality comprises image contrast, and wherein said image processor further comprises a contrast detector, configured for detecting a contrast level of said IR image.

12. An IR sensor in accordance with claim 1, further comprising a mode selector configured for switching between a high-sensitivity operating mode and a low-sensitivity operating mode in accordance with said feedback signal.

13. An IR sensor in accordance with claim 1, further comprising a video processor, configured for processing a sensor array output to form a video image.

14. An IR sensor in accordance with claim 1, wherein said property comprises image SNR.

15. An IR sensor in accordance with claim 1, wherein said property comprises image contrast.

16. An IR sensor in accordance with claim 1, wherein said feedback signal comprises at least one of: average image SNR, maximum image SNR, minimum image SNR, average image contrast, maximum image contrast, and minimum image contrast.

17. A method for IR sensing, comprising:
 performing a readout of a sensor array;
 processing said sensor array readout to obtain an IR image;
 determining a property of said IR image, said property being indicative of image quality;
 generating a feedback signal in accordance with said property, said feedback signal being for adjusting between a field of view and a grouping of sensing pixels so as to derive a required image sensitivity;

if said property crosses a specified threshold, adjusting between field of view and said pixel grouping of said sensor array to provide said required image sensitivity in accordance with said feedback signal; and collecting IR energy over a variable window from an external scene with said sensor array, in accordance with said pixel grouping.

18. A method in accordance with claim 17, further comprising selecting a sensor exposure time.

19. A method in accordance with claim 18, wherein said selecting is to maintain an average collected charge of said sensor at a specified level.

20. A method in accordance with claim 18, wherein said method is performed repetitively at a maximum rate permitted by said pixel grouping and said selected exposure time.

21. A method in accordance with claim 17, wherein said property comprises at least one of: average image SNR, maximum image SNR, minimum image SNR, average image contrast, maximum image contrast, and minimum image contrast.

22. A method in accordance with claim 17, further comprising averaging respective sensor levels over multiple sensor array readout cycles.

23. A method in accordance with claim 17, further comprising switching between a high-sensitivity operating mode and a low-sensitivity operating mode.

24. A method in accordance with claim 17, further comprising analyzing a video IR image to identify specified properties of interest.

25. A method in accordance with claim 17, wherein said property comprises image SNR.

26. A method in accordance with claim 17, wherein said property comprises image contrast.

* * * * *